E. B. BLOXHAM & W. OWEN.
MILITARY OR CAMP KITCHEN.
APPLICATION FILED FEB. 11, 1916.
1,190,216.
Patented July 4, 1916.
2 SHEETS—SHEET 1.
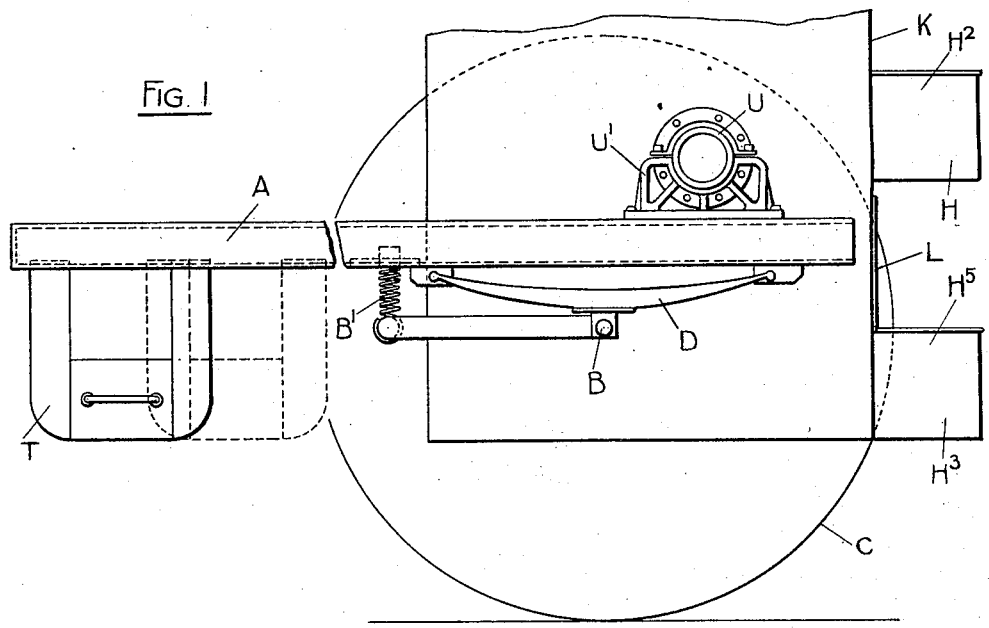
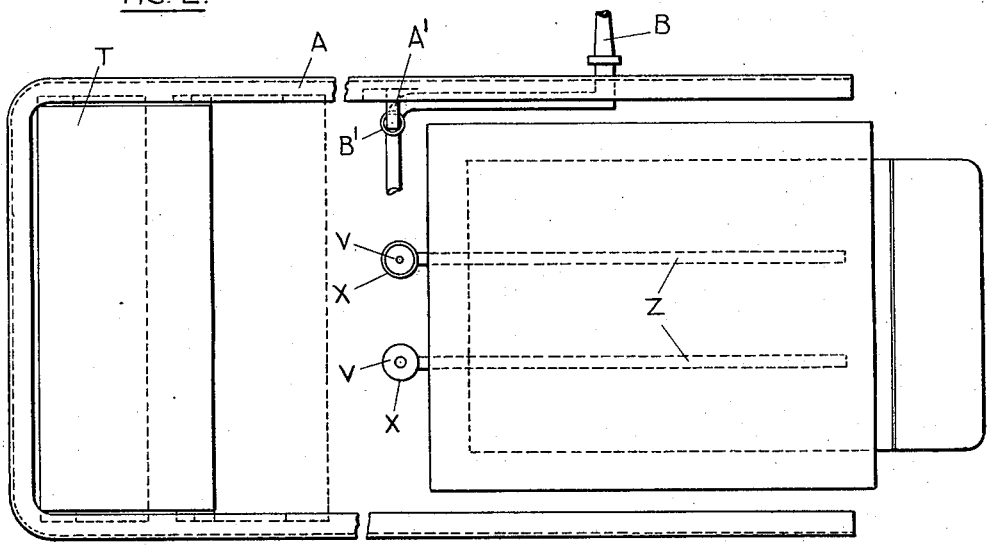
Witnesses—
Lionel Ernest Bussey
Samuel Greenberg
Inventors,
Edwin Burch Bloxham
William Owen
by
Attorney.

E. B. BLOXHAM & W. OWEN.
MILITARY OR CAMP KITCHEN.
APPLICATION FILED FEB. 11, 1916.

1,190,216.

Patented July 4, 1916.
2 SHEETS—SHEET 2.

Witnesses—
Lionel Ernest Bussey.
Samuel Greenberg

Inventors,
Edwin Burch Bloxham,
William Owen.
by
Attorney.

UNITED STATES PATENT OFFICE.

EDWIN BURCH BLOXHAM AND WILLIAM OWEN, OF LONDON, ENGLAND, ASSIGNORS TO THEMSELVES AND WILLIAM GREEN & COMPANY (ECCLESFIELD) LIMITED.

MILITARY OR CAMP KITCHEN.

1,190,216.  Specification of Letters Patent.  Patented July 4, 1916.

Application filed February 11, 1916.  Serial No. 77,739.

*To all whom it may concern:*

Be it known that we, EDWIN BURCH BLOXHAM and WILLIAM OWEN, both residing at 74 Neal street, Shaftesbury avenue, London, W. C., England, engineers, have invented a certain new and useful Improved Military or Camp Kitchen, of which the following is a specification.

This invention relates to an improved military or camp kitchen or cooking apparatus, in which cooking by roasting, stewing, frying or steaming is possible.

According to the invention, the receptacles for stewing or steaming, and the oven or ovens for roasting are mounted within a casing, and fire boxes or grates are mounted beside the casing, so that the flames and gases from the fires may directly pass into the heating chambers surrounding the receptacles or ovens, the position of the fire boxes or grates being such that the top of the fires may also be used for cooking as for example by frying. For this purpose a hot plate is provided hinged or otherwise mounted upon the fire box or grate and capable of being laid in position to close the top of the fire box when required for use. According to the invention, moreover, means are provided for basting the joints during roasting, without the necessity of opening the oven door.

The invention comprises the construction of cooking apparatus as hereinafter described.

The invention is illustrated by way of example in the accompanying drawings in which—

Figure 3:
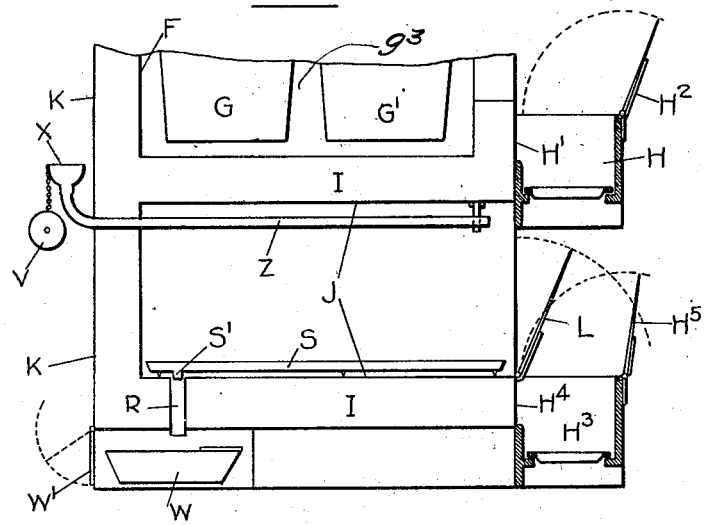
Figure 4:
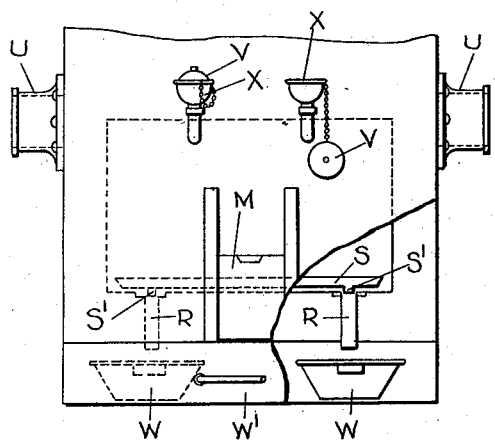

Figure 1 is a side elevation of a military or camp kitchen or cooking apparatus constructed according to the invention. Fig. 2 is a plan corresponding to Fig. 1. Fig. 3 is a vertical sectional side elevation corresponding to Fig. 1 showing the roasting oven and the stewing or steaming receptacles and the heating chambers and fire boxes or grates therefor; while Fig. 4 is a partial end elevation corresponding to Figs. 1, 2 and 3.

In carrying the invention into effect as illustrated in the accompanying drawings, we mount the cooking apparatus upon a frame A of U-form, to which may be secured a limber by which the apparatus may be connected to and be drawn by a vehicle of any kind, or to which shafts or a pole may be connected by which it may be drawn by a horse. At the rear beneath the frame A we mount a receptacle T for carrying fuel and utensils in such manner that it may be adjusted in its position as indicated in dotted lines in Figs. 1 and 2 in order to secure balance of the load upon the axle B by which the frame A and the kitchen mounted upon the frame are carried by the road wheels C. The axle B is cranked and the cranked part is disposed substantially horizontal in order to accommodate the cooking apparatus, while spiral springs $B^1$ are interposed at each side between the axle and a bracket such as $A^1$ secured to the frame. Springs $d$ are positioned between the frame A and axle $b$ for cushioning the frame to relieve the same of sudden jarring while it is being moved over a field or rough road.

The casing K of the cooking apparatus is provided in determined position on each side with trunnions U by which it may be mounted upon the frame A within bearings $U^1$ at each side. The casing may be so mounted that it may be free to move upon the trunnions U during transport and to be fixedly held by suitable means when required for use.

The casing K is provided with a receptacle F which may be mounted upon the casing, and a transverse partition $g^3$ may be centrally mounted within the receptacle F by which two compartments G and G' may be formed, so that thus one compartment may be used for stewing and the other for steaming; or such a partition may be dispensed with as in the construction illustrated in Fig. 3 of the accompanying drawings. Stewing pans or saucepans G G' may be mounted within the receptacle F.

A fire box or grate H may be mounted at the rear of the casing K with an outlet H' by which the flames and gases may pass to the heating chamber I which extends upwardly on each side of the receptacle F. A hot plate $H^2$ may be hinged to the outer edge of the fire box H which may be opened into a position such as that indicated in Fig. 3 when the top of the fire is required for use, or closed to cover the top of the fire box when the hot plate is required for use in frying.

An oven J may be provided beneath the receptacle F, and in such position in the casing K that the heating chamber I extends on each side and at the end. The front of the oven J is provided with a hinged door L, which is capable of being completely lowered to open the oven. A fire box H³ is provided for heating the oven J, and is disposed at the rear of the casing K and in such position that the flames and gases therefrom pass into the heating chamber I through the opening H⁴. A hot plate H⁵ is also provided similar to the hot plate H².

A roasting pan S is mounted in the oven J with outlets S' by which gravy and fat may pass out through the tubes R into a dish W, which is placed within a compartment beneath the oven especially provided for its reception.

Perforated tubes Z extend within the upper part of the oven J and funnels X are provided upon their outwardly protruding ends into which the gravy and fat may be poured from the dish W whence it passes through the perforations in the tubes Z. The joint may thus be basted during roasting, without necessitating the opening of the oven for the purpose. Covers V may be provided for the funnels X. The tubes Z serve as ventilators when the covers V are removed from the funnels X.

A sliding door M may be provided to cover an opening in the casing K by which access is available for cleaning the interior of the casing.

We claim:—

A portable cooking stove comprising a casing containing an oven chamber, a superposed cooking chamber thereabove, and a heating flue therebetween, superposed fire boxes outside the casing for heating both chambers, the upper fire box communicating with said flue, and a hinged cooking top for each fire box.

EDWIN BURCH BLOXHAM.
WILLIAM OWEN.

Witnesses:
WILLIAM EDWARD EVANS,
SAMUEL GREENBERG.

Copies of this patent may be obtained for five cents each, by addressing the "Commissioner of Patents, Washington, D. C."